US011505028B2

(12) United States Patent
Goto et al.

(10) Patent No.: US 11,505,028 B2
(45) Date of Patent: Nov. 22, 2022

(54) VEHICULAR HOLDING DEVICE

(71) Applicant: CHUO HATSUJO KABUSHIKI KAISHA, Aichi (JP)

(72) Inventors: Takashi Goto, Aichi (JP); Hideki Toya, Aichi (JP); Toshio Kuwayama, Aichi (JP); Shinsuke Okura, Aichi (JP)

(73) Assignee: CHUO HATSUJO KABUSHIKI KAISHA, Nagoya (JP)

( * ) Notice: Subject to any disclaimer, the term of this patent is extended or adjusted under 35 U.S.C. 154(b) by 126 days.

(21) Appl. No.: 16/341,473

(22) PCT Filed: Oct. 12, 2017

(86) PCT No.: PCT/JP2017/036994
§ 371 (c)(1),
(2) Date: Apr. 12, 2019

(87) PCT Pub. No.: WO2018/070471
PCT Pub. Date: Apr. 19, 2018

(65) Prior Publication Data
US 2019/0291530 A1 Sep. 26, 2019

(30) Foreign Application Priority Data

Oct. 14, 2016 (JP) .............................. JP2016-202506

(51) Int. Cl.
*B60G 21/055* (2006.01)
*F16H 25/14* (2006.01)
*F16F 1/14* (2006.01)

(52) U.S. Cl.
CPC ....... *B60G 21/055* (2013.01); *B60G 21/0556* (2013.01); *F16F 1/145* (2013.01);
(Continued)

(58) Field of Classification Search
CPC .............. B60G 21/055; B60G 21/0556; B60G 2204/122; B60G 2204/42; B60G 2206/427; B60G 2202/135; F16B 2/00
(Continued)

(56) References Cited

U.S. PATENT DOCUMENTS 6,022,030 A * 2/2000 Fehring .............. B60G 21/0553
267/277
6,152,268 A * 11/2000 Goellner ............... F15B 15/262
188/170
(Continued)

FOREIGN PATENT DOCUMENTS

| CN | 101980878 | 2/2011 |
| CN | 105270131 | 1/2016 |

(Continued)

OTHER PUBLICATIONS

The International Searching Authority mailed International Search Report dated Nov. 28, 2017 for International Application No. PCT/JP2017/036994, filed on Oct. 12, 2017 and published as WO/2018/070471 on Apr. 19, 2018 (Applicant—Chuo Hatsujo Kabushiki Kaisha) (Original—2 Pages/ Translated—1 pages).
The International Searching Authority mailed Written Opinion of the International Searching Authority dated Nov. 28, 2017 for International Application No. PCT/JP2017/036994, filed on Oct. 12, 2017 and published as WO/2018/070471 on Apr. 19, 2018 (Applicant—Chuo Hatsujo Kabushiki Kaisha)(Original—3 pages).

*Primary Examiner* — Xuan Lan Nguyen
(74) *Attorney, Agent, or Firm* — Ballard Spahr LLP (57) ABSTRACT

Provided is a vehicular holding device that, in an ON state, holds a vehicle component in a state where displacement of the vehicle component in an axial direction is restrained, and that, in an OFF state, holds the vehicle component in a state where displacement of the vehicle component in the axial direction is possible. The vehicular holding device includes at least one engagement part, a cam mechanism, and an axial direction restraining part. The at least one engagement part is at a position where the engagement part engages with an engaged part in the ON state, and is at a position where the
(Continued)

engagement part is separated from the engaged part in the OFF state. The cam mechanism displaces the at least one engagement part from the OFF-state position to the ON-state position. The axial direction restraining part receives axial-direction force acting on the at least one engagement part.

6 Claims, 8 Drawing Sheets (52) U.S. Cl.
CPC ....... *F16H 25/14* (2013.01); *B60G 2202/135* (2013.01); *B60G 2202/412* (2013.01); *B60G 2202/44* (2013.01); *B60G 2204/122* (2013.01); *B60G 2204/42* (2013.01); *B60G 2204/424* (2013.01); *B60G 2204/62* (2013.01); *B60G 2206/1116* (2013.01); *B60G 2206/427* (2013.01); *B60G 2500/22* (2013.01); *B60G 2800/0122* (2013.01)

(58) Field of Classification Search
USPC .......................................................... 188/67
See application file for complete search history.

(56) References Cited

U.S. PATENT DOCUMENTS

| 8,485,539 | B2 * | 7/2013 | Bidlake | B60G 17/0162 |
| | | | | 280/124.107 |
| 8,616,343 | B2 * | 12/2013 | Wako | F16C 33/36 |
| | | | | 188/67 |
| 2010/0259024 | A1 | 10/2010 | Bidlake | |

FOREIGN PATENT DOCUMENTS

| CN | 101014474 | | 8/2017 | |
| DE | 102009054675 | A1 * | 6/2011 | ......... B60G 21/0556 |
| JP | 2007230339 | A | 9/2007 | |
| JP | 2015230029 | A | 12/2015 | |
| JP | 2016034800 | A | 3/2016 | |
| WO | WO 2018/070471 | A1 | 4/2018 | |

* cited by examiner

VEHICULAR HOLDING DEVICE

CROSS-REFERENCE TO RELATED APPLICATIONS

This application is a U.S. National Phase Application of International Application No. PCT/JP2017/036994, filed Oct. 12, 2017, which claims priority to Japanese Application No. 2016-202506, filed Oct. 14, 2016, each of which are hereby incorporated by reference in their entirety.

TECHNICAL FIELD

The present disclosure relates to a vehicular holding device (a holding device for use in a vehicle), which is capable of switching a state where a shaft-shaped vehicle component for supporting a stabilizer or the like is held.

BACKGROUND ART

For example, in a vehicular holding device described in Patent Reference 1, the state of the vehicular holding device is switched to an ON state where a displacement of a stabilizer in an axial direction is restrained, by embedding an engagement portion into a concave engaged portion (a portion is engaged with the engagement portion when the vehicular holding device is in an ON state) provided in the stabilizer.

PRIOR ART REFERENCE

Patent Reference

Patent Reference 1: Japanese Patent Publication No. 2015-230029

SUMMARY

Problems to be Solved by the Disclosure

In the technique described in Patent Reference 1, the engagement portion is provided on a front-end side of a leaf spring portion, and an annular ring portion provided on a root side of the leaf spring portion is fixed to a base portion. Therefore, in this technique, when the state of the vehicular holding device is the ON state, a force in an axial direction acting on the stabilizer (hereinafter referred to as an axial force) is received by the leaf spring portion.

Therefore, it is necessary to ensure that the cross-sectional area of the leaf spring portion is sized to bear the axial force. Therefore, the cross-sectional area of the leaf spring portion becomes larger. Furthermore, as the cross-sectional area increases, a force required to displace the engagement portion, that is, an elastic force generated by the leaf spring portion also increases.

On the other hand, the elastic force generated by the leaf spring portion is sufficient as long as it is large enough to enable the engagement portion embedded into the engaged portion disengaged from the engaged portion.

Therefore, in general, the elastic force generated by the leaf spring portion may be small. Further, if the elastic force generated by the leaf spring portion is large, the force required to displace the engagement portion (hereinafter referred to as an operating force) is increased.

Therefore, in the technique described in Patent Reference 1, the elastic force generated at the front-end side of the leaf spring portion, that is, the operating force is reduced by elongating a length of the leaf spring portion in a longitudinal direction. However, with this configuration, it is difficult to achieve miniaturization of the vehicular holding device since the length of the leaf spring portion in the longitudinal direction becomes longer.

Therefore, in one aspect of the present disclosure, it is desirable to achieve miniaturization of the vehicular holding device.

Means for Solving the Problems

A vehicular holding device of the present disclosure is configured to hold a vehicle component, and be capable of switching a state of the vehicular holding device between an ON state and an OFF state. The ON state is a state in which the vehicle component is held in a state where a displacement of the vehicle component in an axial direction of the vehicle component is restrained (prevented). Further, the OFF state is a state in which the vehicle component is held in a state where a displacement of the vehicle component in an axial direction is possible.

The vehicular holding device includes at least one engagement portion, a cam mechanism, and an axial restraining portion. The at least one engagement portion is displaced in a direction perpendicular to the axial direction in such a manner as to be brought into contact with or separated from the vehicle component, is located, in the ON state, at a position where it is engaged with an engaged portion provided in the vehicle component, and is located, in the OFF state, at a position where it is disengaged from the engaged portion. Further, the cam mechanism displaces the at least one engagement portion from the position in the OFF state to the position in the ON state. The axial restraining portion receives a force in the axial direction acting on the at least one engagement portion by facing and coming into contact with the at least one engagement portion in the axial direction.

Thus, it becomes a configuration in which the axial force is received by the axial restraining portion. Therefore, miniaturization of the vehicular holding device can be achieved. Further, the operating force for the vehicular holding device can be restrained.

DESCRIPTION OF THE REFERENCE NUMERALS

1 . . . vehicular holding mechanism, 3 . . . casing, 5 . . . casing cap,

10 ... engagement device, 11 ... engagement mechanism, 11A ... engagement portion,
11B ... engaged portion, 11C ... disengagement spring, 11D ... cam surface,
13 ... cam mechanism,
13A ... cam ring, 13C ... protrusion portion, 13D ... lever portion,
13E ... locking portion, 13F ... connecting locking portion, 13G ... control cable,
15 ... axial restraining portion, 15A ... first blocking member,
15B ... second blocking member, 15C ... circumferential restraining portion,
15D ... circumferential restraining portion, 15E, 15F ... groove portion, P1 ... stabilizer,
P2 ... connecting rod, P3 ... flange portion, P4 ... communication port.

DETAILED DESCRIPTION OF EMBODIMENTS

An example of an embodiment will be described below. That is to say, the configurations and the like recited in the claims are not limited to the specific units, structures, or the like illustrated in the following embodiments.

In the following embodiments, a mechanism configured to hold a connecting rod will be described. Arrows or the like indicating directions marked in respective drawings are recited in order to facilitate understanding of the relationship between the respective drawings. The present disclosure is not limited to the directions marked in the respective drawings.

Except for the case where the term "one" or the like is recited, a member or portion at least described with a reference numeral denoted will be provided in a number of at least one. That is to say, two or more members or portions may be provided.

First Embodiment

1. Overview of the Vehicular Holding Mechanism

Figure 1:
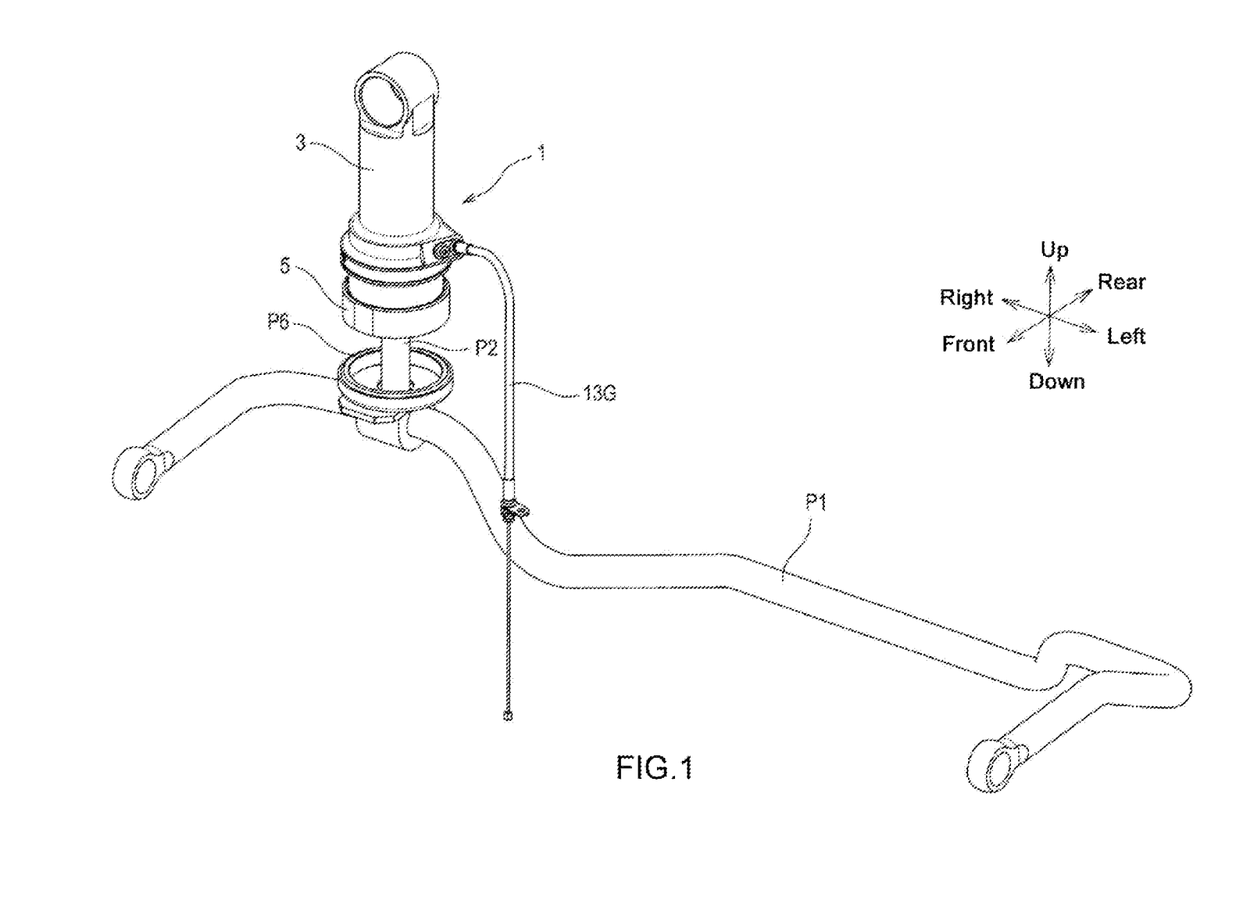
FIG. 1 shows a state in which a vehicular holding mechanism of a first embodiment is mounted in a vehicle.

FIG. 1 shows a vehicular holding mechanism 1, a stabilizer P1, and a connecting rod P2 according to a first embodiment. The connecting rod P2 is an example of a shaft-shaped vehicle component, and is a vehicle component that supports the stabilizer P1. The stabilizer P1 is a torsion bar-shaped member that is configured to restrain the roll of the vehicle body.

The vehicular holding mechanism 1 is configured to enable the state of the vehicular holding mechanism 1 to be switched between an ON state and an OFF state. The ON state refers to a state in which the connecting rod P2 is held in a state where a displacement of the connecting rod P2 in its axial direction is restrained (see FIG. 3A). On the other hand, the OFF state refers to a state in which the connecting rod P2 is held in a state where the connecting rod P2 is displaceable in the axial direction (see FIG. 3B).

Figure 2:
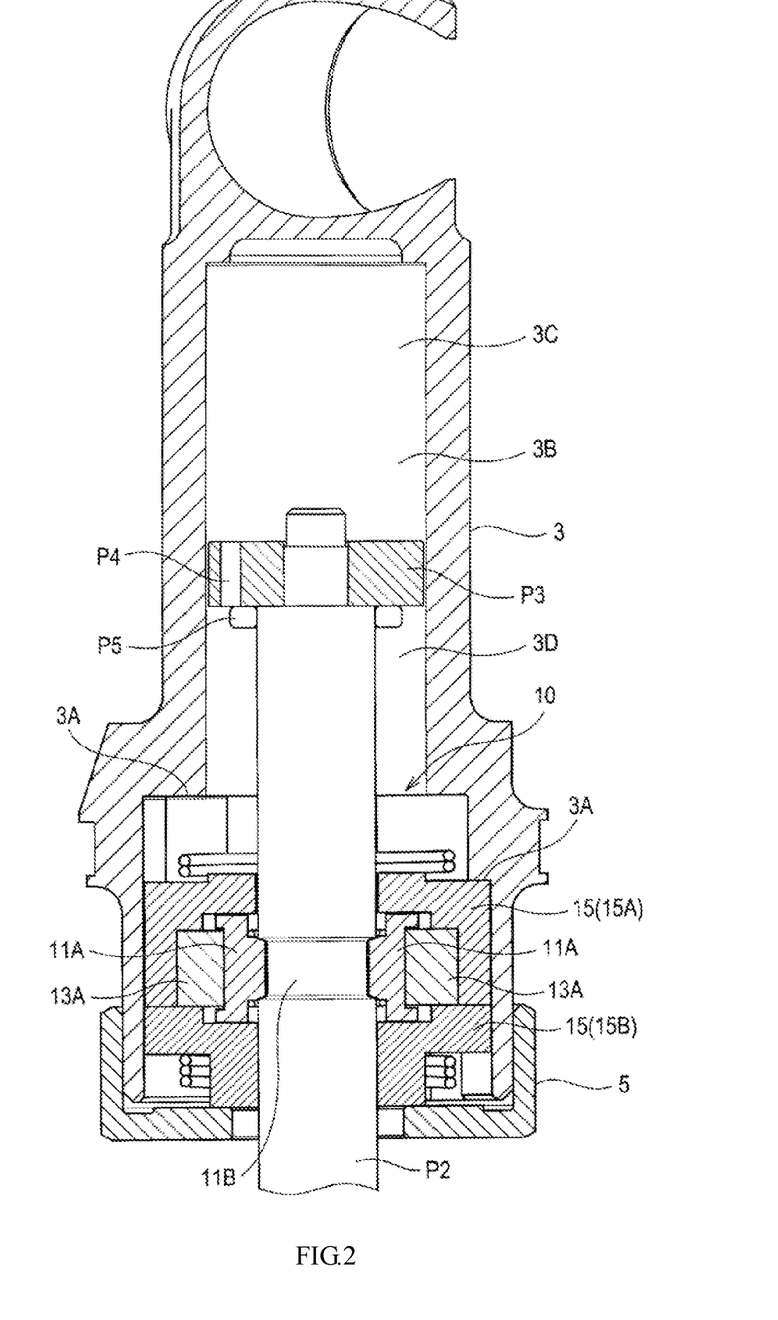
FIG. 2 is a sectional view of the vehicular holding mechanism of the first embodiment.

2. Configuration of the Vehicular Holding Mechanism 2.1 Overview of the Vehicular Holding Mechanism As shown in FIG. 2, the vehicular holding mechanism 1 includes an engagement device 10, a casing 3, a casing cap 5, and so on. The casing 3 is a housing with a cylindrical space for accommodating the engagement device 10. The casing cap 5 is a cover that seals an opening of the casing 3.

The engagement device 10 is fixed inside the casing 3 in a state of being clamped between a stepped portion 3A provided in the casing 3 and the casing cap 5. The connecting rod P2 passes through the engagement device 10, and its front-end side reaches a space 3B enclosed by the casing 3 and the engagement device 10.

A flange-like flange portion P3 protruding in a radial direction from the connecting rod P2 is provided on the front-end side of the connecting rod P2. Therefore, the space 3B is in a state of being divided into two spaces 3C and 3D by the flange portion P3. Furthermore, a communication port P4 that communicates the space 3C and the space 3D is provided in the flange portion P3.

The flange portion P3 is slidably contacted with an inner circumferential surface of the casing 3 to guide the displacement of the connecting rod P2 along the axial direction Lo, thereby restraining a significant inclination of the connecting rod P2 in the OFF state. The communication port P4 restrains an increase in air pressure difference between the space 3C and the space 3D, so that the connecting rod P2 can be properly displaced.

In addition, a damper P5 and a damper P6 shown in FIG. 1 are elastic members such as rubber. The damper P5 is configured to avoid direct collision between the flange portion P3 and the engagement device 10 when the connecting rod P2 is displaced downward. Further, the damper P6 is configured to avoid direct collision between the stabilizer P1 and so on and the casing cap 5 when the connecting rod P2 is displaced upward.

2.2 Configuration of the Engagement Mechanism

Figure 4:
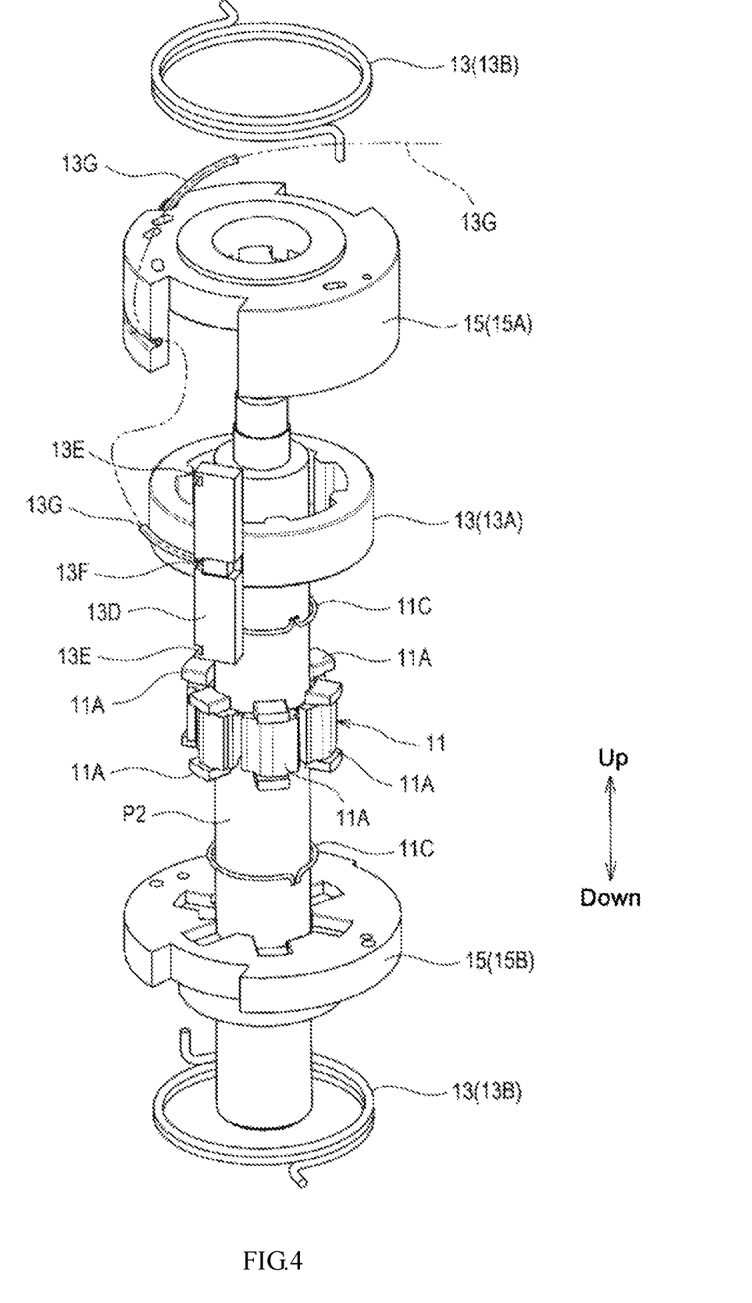
FIG. 4 is an exploded perspective view of the vehicular holding mechanism of the first embodiment.

The engagement device 10 is a mechanism configured to switch the state of the vehicular holding mechanism 1 between the ON state and the OFF state. As shown in FIG. 4, the engagement device 10 of the first embodiment at least includes an engagement mechanism 11, a cam mechanism 13, an axial restraining portion 15, and so on.

The engagement mechanism 11 of the first embodiment includes a plurality of engagement portions 11A, each having a first end 20 and a second end 22. Each of the engagement portions 11A is a member made of metal. Further, as shown in FIG. 3A and FIG. 3B, each of the engagement portions 1 IA is displaced in a direction perpendicular to the axial direction Lo in such a manner as to be brought into contact with or separated from the connecting rod P2.

Further, in the ON state, each of the engagement portions 11A is located at a position where it is engaged with an engaged portion 11B provided in the connecting rod P2. On the other hand, in the OFF state, each of the engagement portions 11A is located at a position where it is disengaged from the engaged portion 11B.

As shown in FIG. 4, the plurality of engagement portions 11A are disposed at equal intervals along an outer circumference of the connecting rod P2 in such a manner as to surround the outer circumference of the connecting rod P2. The engaged portion 11B is a concave groove portion recessed from the outer circumferential surface side toward the center of the connecting rod P2, and is formed over the entire circumference along the outer circumferential direction as an O-ring groove portion.

Figure 3A:
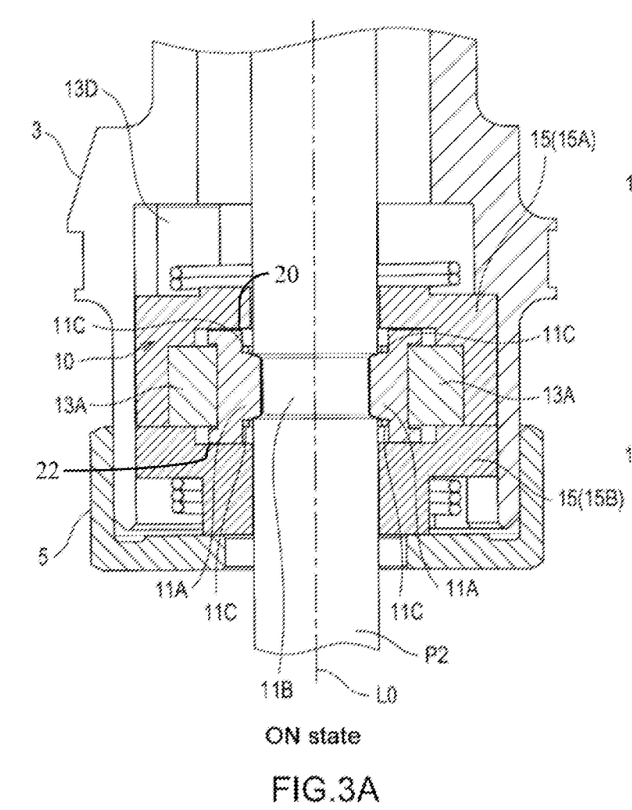
FIGS. 3A and 3B are sectional views of an engagement device of the first embodiment.
Figure 3B:
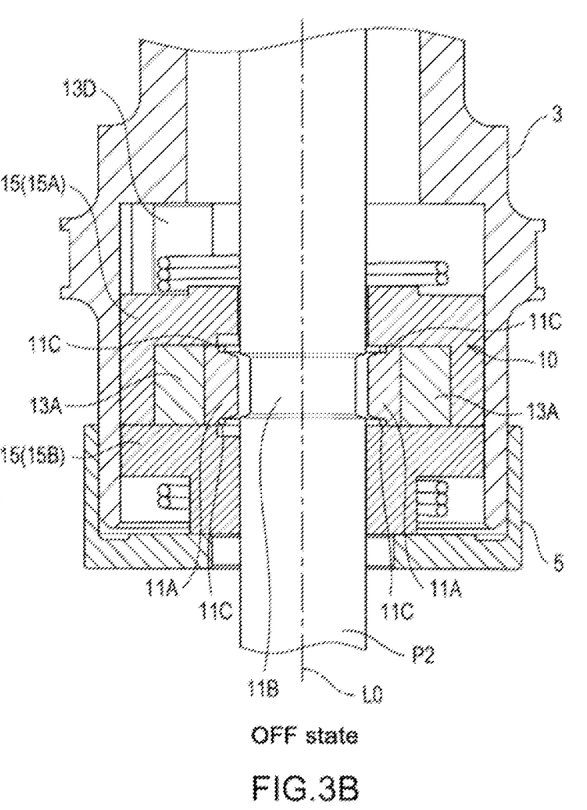

Therefore, in the ON state, each engagement portion 11A, which is a convex portion, is embedded into the engaged portion 11B which is a groove portion, so as to be brought into an engaged state (see FIG. 3A). In the OFF state, each engagement portion 11A, which is a convex portion, is separated from the engaged portion 11B which is a groove portion, so as to be brought into a disengaged state (see FIG. 3B).

In the engagement mechanism 11, at least one disengagement spring 110 is disposed on the side of the connecting rod P2 of the plurality of engagement portions 11A annularly arranged (that is, at least one disengagement spring 11C is disposed on a side closer to the connecting rod P2 than the plurality of engagement portions 11A annularly arranged). The at least one disengagement spring 11C applies, to these engagement portions 11A, an elastic force that displaces the plurality of engagement portions 11A from the positions in the ON state (in other words, the engaged state) to the positions in the OFF state (in other words, the disengaged state).

Figure 5A:
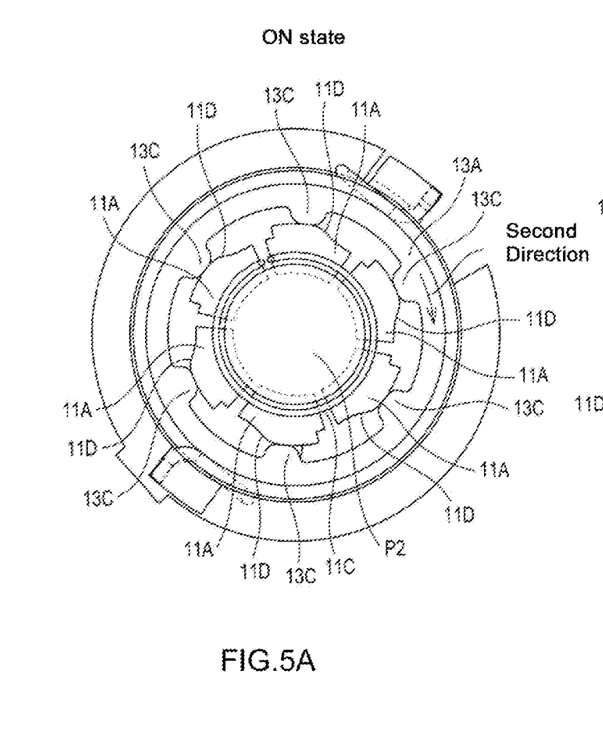
FIGS. 5A and 5B are schematic views showing movements of the engagement device of the first embodiment.
Figure 5B:
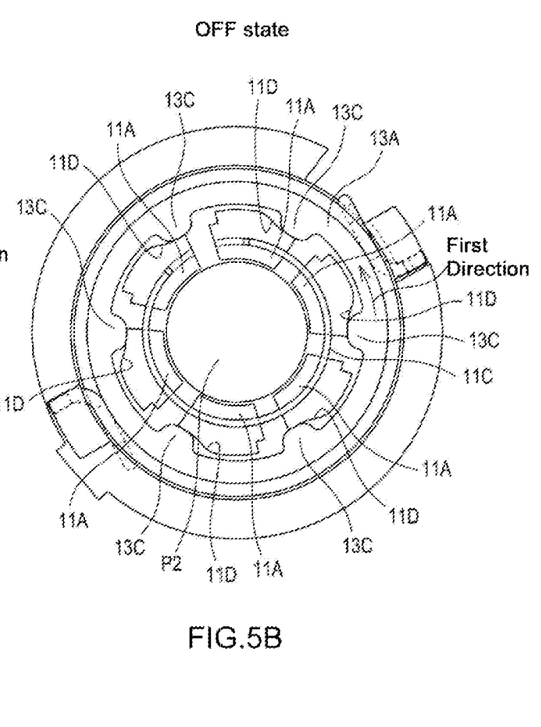

As shown in FIG. 5A and FIG. 5B, the at least one disengagement spring 11C is an annular spring that is partially opened or cut (i.e. the spring has two ends capable of being disconnected) such as in a C-shape or the like. That is to say, the at least one disengagement spring 11C is restored and displaced in such a manner that the radius of curvature is increased, and applies the abovementioned elastic force to each of the engagement portions 11A. In addition, as shown in FIG. 4, in the first embodiment, as the at least one disengagement spring 11C, a plurality of (e.g., two) disengagement springs 11C are arranged in the axial direction with the respective engagement portions 11A in between, and provided on both sides of the respective engagement portions 11A.

The cam mechanism 13 displaces each engagement portion 11A from a position in the OFF state to a position in the ON state. That is to say, the cam mechanism 13 applies, to each engagement portion 11A, a force counteracting the elastic force of the two disengagement springs 11C, so that the plurality of engagement portions 11A are displaced from the position in the OFF state (disengaged state) to the position in the ON state (engaged state), respectively.

As shown in FIG. 4, the cam mechanism 13 of the first embodiment includes a cam ring 13A and at least one torsion spring 13B. The cam ring 13A is a member made of metal that is rotatable in a circumferential direction with the axis of the connecting rod P2 as a central axis.

Further, as shown in FIG. 5B, when the cam ring 13A is rotated in a first direction, the position of each engagement portion 11A is displaced from the position in the OFF state to the position in the ON state. When the cam ring 13A is rotated in a second direction, that is, a direction opposite to the first direction, each engagement portion 11A is displaced from the position in the ON state to the position in the OFF state.

Figure 6A:
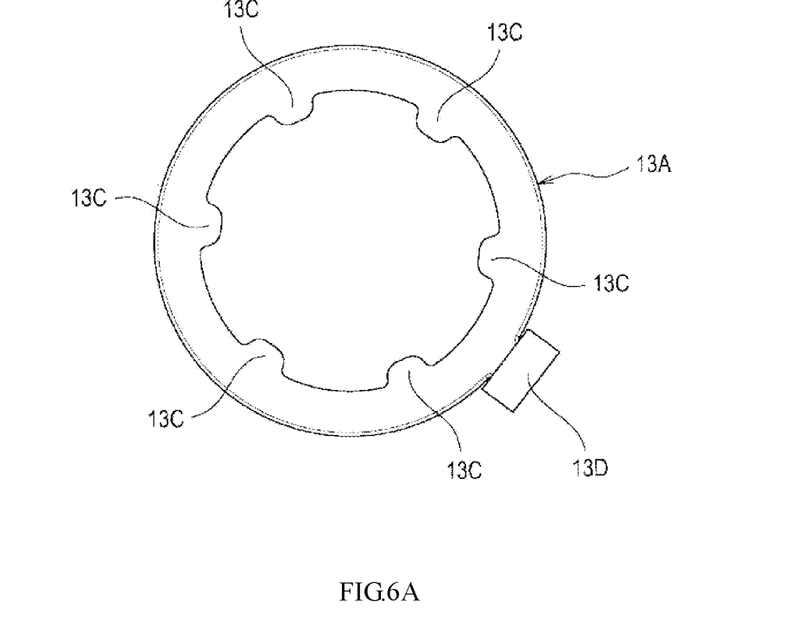
FIG. 6A is a front view of a cam ring of the first embodiment.

That is to say, as shown in FIG. 6A, an inner circumferential surface of the annular cam ring 13A is provided with a plurality of protrusion portions 13C protruding toward the center thereof. These protrusion portions 13C are provided in the same number as that of the plurality of engagement portions 11A, and are slidably contacted with cam surfaces 11D (see FIG. 5A, etc.) provided on the respective engagement portions 11A.

Figure 6B:
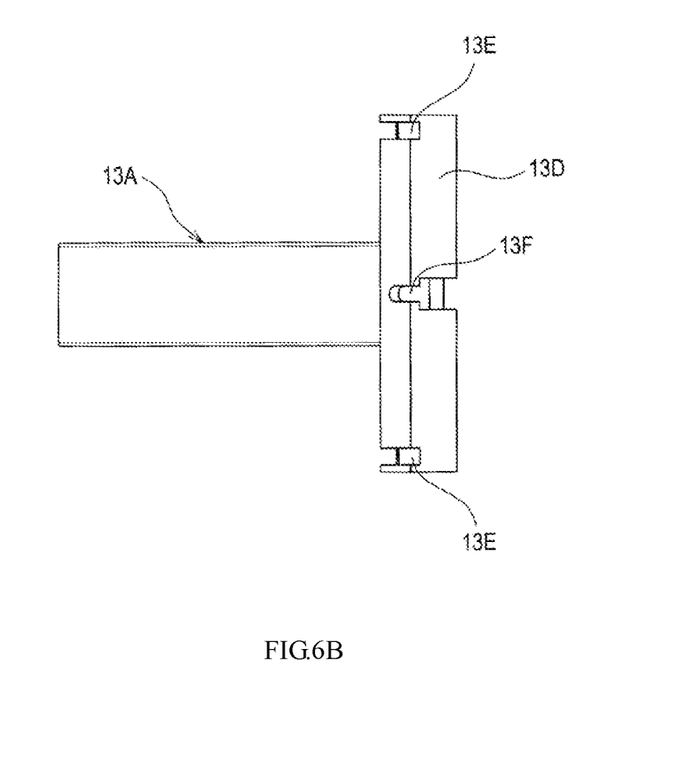
FIG. 6B is a side view of the cam ring of the first embodiment.

As shown in FIG. 6B, a lever portion 13D is provided on the outer circumference of the cam ring 13A. On the outer circumferential surface of the cam ring 13A, the lever portion 13D extends in a direction parallel to the axial direction Lo.

The lever portion 13D is provided with at least one locking portion 13E by which a first end of the torsion spring 13B is hooked and locked. As shown in FIG. 4, in the first embodiment, an intermediate portion in the extending direction of the lever portion 13D is mounted to the cam ring 13A. Further, the locking portions 13E are provided at both ends in the extending direction of the lever portion 13D.

That is to say, in the first embodiment, two torsion springs 13B are provided. Furthermore, the respective torsion springs 13B are arranged in the axial direction with the cam ring 13A in between, and are provided on both sides of the cam ring 13A, respectively. The two torsion springs 13B apply an elastic force in the first direction to the cam ring 13A.

That is to say, the two torsion springs 13B apply, to the cam ring 13A, an elastic force that causes the cam ring 13A to rotate in a direction where each engagement portion 11A is displaced from a position in the OFF state (disengaged state) to a position in the ON state (engaged state).

A connecting locking portion 13F is provided on the lever portion 13D or the cam ring 13A (the intermediate portion in the extending direction of the lever portion 13D in the first embodiment). The connecting locking portion 13F is connected to a first end of a control cable 13G (see FIG. 4).

The control cable 13G is a cable that is operated by a person driving this vehicle. If the control cable 13G is operated, a rotational force in the second direction, i.e., in a direction where each engagement portion 11A is displaced from a position in the ON state (engaged state) to a position in the OFF state (disengaged state), acts on the cam ring 13A.

Therefore, if the control cable 13G is operated, the position of each engagement portion 11A is changed to a position in the OFF state. Further, if the operating force for the control cable 13G disappears, the position of each engagement portion 11A is restored to a position in the ON state by the elastic force of the two torsion springs 13B, and the position in the ON state is maintained.

As shown in FIG. 3A, the axial restraining portion 15 receives a force in the axial direction Lo acting on these engagement portions 11A by facing and coming into contact with the respective engagement portions 11A in the axial direction Lo. That is to say, as shown in FIG. 4, the axial restraining portion 15 includes a first blocking member 15A, a second blocking member 15B, and so on. In some aspects, the first blocking member 15A can come into contact with the first ends 20 of the engagement portions 11A and receive, from the first ends of the engagement portions 11A, a force in a direction from the second ends of the engagement portions toward the first ends of the engagement portions. In further aspects, the second blocking member 15B can come into contact with the second ends 20 of the engagement portions 11A and receive, from the second ends of the engagement portions 11A, a force in a direction from the first ends of the engagement portions toward the second ends of the engagement portions.

The first blocking member 15A is disposed on a first end side (upper side in FIG. 4) in the axial direction of the respective engagement portions 11A, and is brought into contact with the respective engagement portions 11A. The second blocking member 15B is disposed on a second end side (lower side in FIG. 4) in the axial direction of the respective engagement portions 11A, and is brought into contact with the respective engagement portions 11A.

That is to say, the respective engagement portions 11A are sandwiched by the first blocking member 15A and the second blocking member 15B which are arranged in the axial direction Lo. Therefore, the axial restraining portion 15 can receive the force in the axial direction Lo acting on the respective engagement portions 11A.

In addition, as shown in FIG. 2, the first blocking member 15A is brought into contact with the stepped portion 3A of the casing 3 so as to fix the position of the first end side in the axial direction. The second blocking member 15B is brought into contact with the casing cap 5 so as to fix the position of the second end side in the axial direction.

Figure 7A:
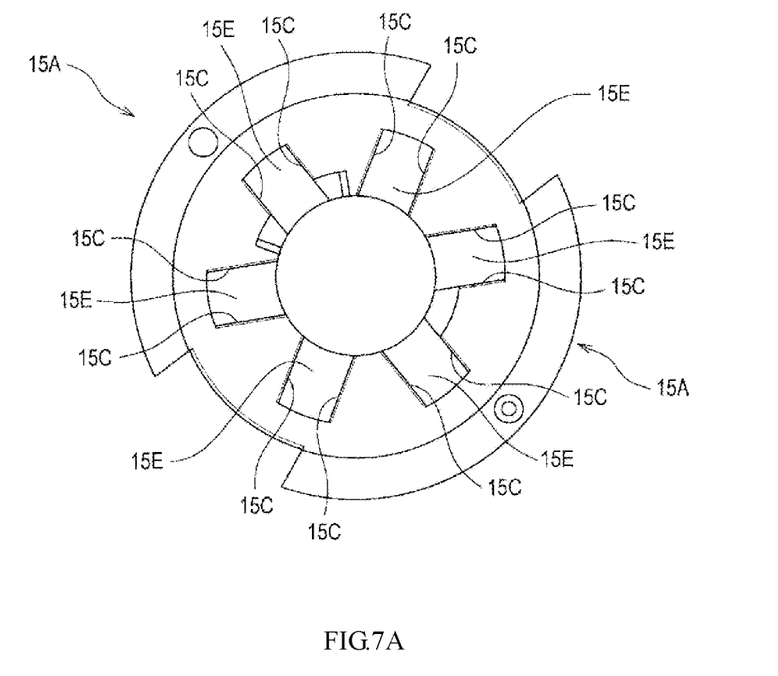
FIG. 7A shows a first blocking member of the first embodiment.
Figure 7B:
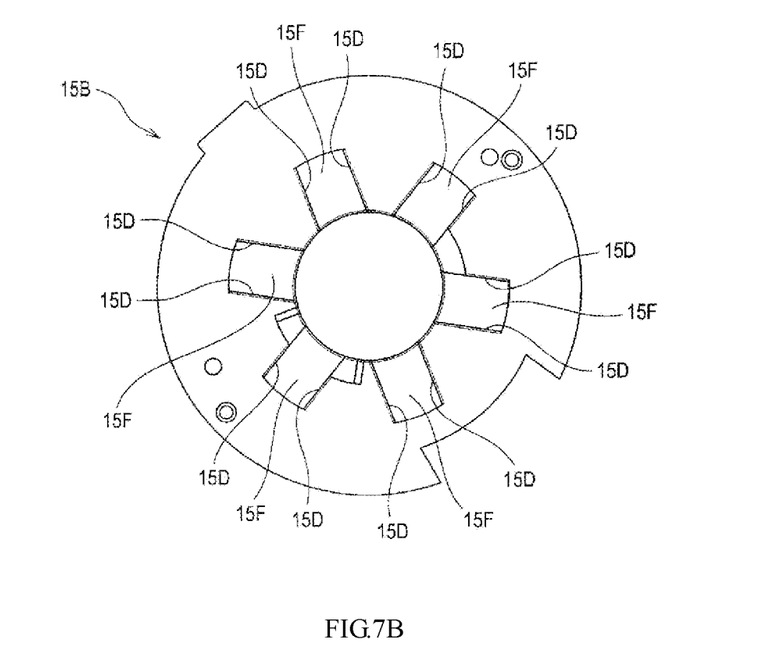
FIG. 7B shows a second blocking member of the first embodiment.

Further, as shown in FIG. 7A, a plurality of circumferential restraining portions 15C are provided at parts of the first blocking member 15A that are brought into contact with the respective engagement portions 11A. As shown in FIG. 7B, a plurality of circumferential restraining portions 15D are provided at parts of the second blocking member 15B that are brought into contact with the respective engagement portions 11A.

Each of the circumferential restraining portions 15C, 15D is a wall-shaped part that is slidably contacted with a corresponding respective engagement portion 11A and configured to restrain the displacement of the engagement portion 11A in a circumferential direction with the axis of the connecting rod P2 as a central axis. That is to say, a pair of circumferential restraining portions 15C, 15D facing each other constitute side walls of a groove portion 15E, 15F extending in the radial direction.

Both end portions of each engagement portion 11A in the axial direction are embedded into the respective groove portions 15E and 15F in a state of being slidably contacted therewith, respectively. Therefore, each engagement portion 11A is restrained from being displaced in the axial direction Lo and in the circumferential direction, and is displaced in the radial direction of the connecting rod P2, so that it can be displaced in such a manner as to be brought into contact with or disengaged from the engaged portion 11B.

2.3 Movement of the Engagement Mechanism

When the control cable 13G is not operated, each engagement portion 11A is engaged with the engaged portion 11B by means of the elastic force of the two torsion springs 13B, and as shown in FIG. 3A, the position of each engagement portion 11A is changed to the position in the ON state.

If the control cable 13G is operated by being pulled, the cam ring 13A is rotated in the second (see FIG. 5A) direction, each engagement portion 11A is disengaged from the engaged portion 11B by means of the elastic force of the at least one disengagement spring 110, and as shown in FIG. 3B, the position of each engagement portion 11A is changed to the position in the OFF state.

If the control cable 13G is returned to the initial state in the OFF state, the cam ring 13A is rotated in the first direction (see FIG. 5B) by means of the elastic force of the two torsion springs 13B, each engagement portion 11A is engaged with the engaged portion 11B, and as shown in FIG. 3A, the position of each engagement portion 11A is restored to the position in the ON state.

3. Features of the Vehicular Holding Device (Especially the Engagement Mechanism) of the First Embodiment In the first embodiment, the first blocking member 15A and the second blocking member 15B receive the axial force acting on each engagement portion 11A. Therefore, miniaturization of the vehicular holding mechanism 1 can be achieved as compared with the case where the axial force is received by the leaf spring portion. Further, it becomes possible to restrain the operating force for the vehicular holding mechanism 1.

Each of the circumferential restraining portions 15C, 15D is slidably contacted with a corresponding respective engagement portion 11A, and is configured to restrain the displacement of the respective engagement portion 11A in a circumferential direction with the axis of the connecting rod P2 as a central axis. Thus, when the axial force acts on each engagement portion 11A, the displacement of each engagement portion 11A in the circumferential direction can be restrained.

The at least one disengagement spring 110 applies, to these engagement portions 11A, an elastic force that displaces the plurality of engagement portions 11A from the positions in the ON state (in other words, the engaged state) to the positions in the OFF state (in other words, the disengaged state). Thus, miniaturization of the vehicular holding mechanism 1 can be reliably achieved without the leaf spring portion.

The engagement mechanism 11 is accommodated in the casing 3. Thus, each of the engagement portions 11A, the axial restraining portion 15, and the cam mechanism 13 can be protected by the casing 3, thereby the mountability to the vehicle can be improved.

Second Embodiment

Figure 8:
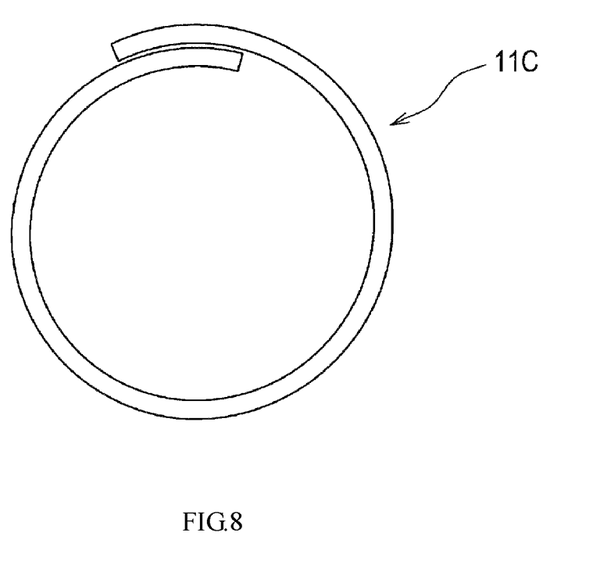
FIG. 8 shows a disengagement spring of a second embodiment.

As shown in FIG. 8, the at least one disengagement spring 11C of the second embodiment is an annular spring in which the opened or cut portions partially overlap. In addition, the same constituent elements or the like as those of the first embodiment are denoted by the same reference numerals as those of the first embodiment, and thus a repetitive description will be omitted.

OTHER EMBODIMENTS

In the above embodiments, the vehicular holding mechanism 1 includes circumferential restraining portions 15C and 15D. However, the present disclosure is not limited thereto. That is to say, for example, the vehicular holding mechanism 1 may not include the circumferential restraining portions 15C and 15D.

In the above embodiments, the vehicular holding mechanism 1 includes multiple engagement portions 11A, and these multiple engagement portions 11A are disposed in a ring shape in the circumferential direction. However, the present disclosure is not limited thereto. That is to say, the vehicular holding mechanism 1 may be configured such that, for example, one engagement portion 11A is displaced in the radial direction in such a manner as to be brought into contact with or disengaged from the engaged portion 11B.

The engaged portion 11B of the above embodiments is configured as a groove portion provided on the outer circumference of the connecting rod P2. However, the present disclosure is not limited thereto. That is to say, for example, the engaged portion 11B may be a concave portion recessed from the outer circumference toward the center of the connecting rod P2, or a through hole passing through the connecting rod P2 in the radial direction.

In the above embodiments, an annular spring partially opened is used as the at least one disengagement spring 110. However, the present disclosure is not limited thereto. That is to say, for example, the at least one disengagement spring 110 may be a coil spring, or may be made of rubber or the like.

In the above embodiments, the vehicular holding mechanism 1 includes at least one disengagement spring 110. However, the present disclosure is not limited thereto. That is to say, the vehicular holding mechanism 1 may not include the at least one disengagement spring 110.

In the above embodiments, the cam ring 13A is rotated by the control cable 13G. However, the present disclosure is not limited thereto. That is to say, for example, the cam ring 13A may be rotated by an electric actuator such as a electromagnetic element or the like.

In the above embodiments, the axial restraining portion 15 is composed of the first blocking member 15A and the second blocking member 15B. However, the present disclosure is not limited thereto. That is to say, for example, the casing 3 may be provided with a function equivalent to that of the axial restraining portion 15.

Furthermore, the present disclosure is not limited to the above embodiments as long as the gist of the configurations recited in the claims is met. Therefore, at least two of the above multiple embodiments can be combined.

The invention claimed is:

1. A vehicular holding device, which is configured to hold a vehicle component, wherein the vehicular holding device is configured to enable a state of the vehicular holding device to be switched between an ON state and an OFF state,
the ON state is a state in which the vehicle component is held in a state where a displacement of the vehicle component in an axial direction of the vehicle component is prevented,
the OFF state is a state in which the vehicle component is held in a state where the displacement of the vehicle component in the axial direction is possible,
the vehicular holding device comprises:
at least one engagement portion configured to be displaced in a direction perpendicular to the axial direction in such a manner as to be brought into contact with or disengaged from the vehicle component, be located in the ON state at a position where the at least one engagement portion is engaged with an engaged portion of the vehicle component, and be located in the OFF state at a position where the at least one engagement portion is disengaged from the engaged portion, wherein the at least one engagement portion has a first end and an axially opposed second end;
a cam mechanism configured to displace the at least one engagement portion from the position in the OFF state to the position in the ON state; and
an axial restraining portion configured to receive, by facing and coming into contact with the first end of the at least one engagement portion in the axial direction, a force in the axial direction acting on the at least one engagement portion from the second end of the at least one engagement portion and toward the first end of the at least one engagement portion,
wherein the at least one engagement portion comprises a plurality of engagement portions provided in such a manner as to surround an outer circumference of the vehicle component, and
wherein the vehicular holding device comprises an annular spring partially opened and configured to apply, to the plurality of engagement portions, an elastic force for displacing the plurality of engagement portions from the positions in the ON state to the positions in the OFF state.

2. The vehicular holding device according to claim 1, further comprising a circumferential restraining portion, which is slidably contacted with the at least one engagement portion and configured to prevent a displacement of the at least one engagement portion in a circumferential direction with an axis of the vehicle component as a central axis.

3. The vehicular holding device according to claim 1, further comprising a casing configured for accommodating the at least one engagement portion and the axial restraining portion,
wherein the cam mechanism comprises:
a cam ring, which is rotatable in a circumferential direction with an axis of the vehicle component as a central axis, and configured to displace the at least one engagement portion from the position in the OFF state to the position in the ON state when rotating in a first direction, and
a torsion spring, configured to apply, to the cam ring, an elastic force that enables the cam ring to rotate in the first direction; and
the cam ring and the torsion spring are further accommodated in the casing.

4. The vehicular holding device according to claim 2, further comprising a casing configured for accommodating the at least one engagement portion and the axial restraining portion,
wherein the cam mechanism comprises:
a cam ring, which is rotatable in a circumferential direction with an axis of the vehicle component as a central axis, and configured to displace the at least one engagement portion from the position in the OFF state to the position in the ON state when rotating in a first direction, and
a torsion spring, configured to apply, to the cam ring, an elastic force that enables the cam ring to rotate in the first direction; and
the cam ring and the torsion spring are further accommodated in the casing.

5. The vehicular holding device according to claim 1, wherein the axial restraining portion is configured to receive, by facing and coming into contact with the second end of the at least one engagement portion in the axial direction, a second force in the axial direction acting on the at least one engagement portion from the first end of the at least one engagement portion and toward the second end of the at least one engagement portion.

6. The vehicular holding device according to claim 1, wherein the axial restraining portion comprises a first blocking member positioned on a first side of the at least one engagement portion, and wherein the vehicular holding device further comprises a second blocking member positioned on an opposing second side of the at least one engagement portion that is spaced in the axial direction from the first side of the at least one engagement portion, wherein the second blocking member is configured to receive, by facing and coming into contact with the second end of the at least one engagement portion in the axial direction, a force in the axial direction acting on the at least one engagement portion from the first end of the at least one engagement portion and toward the second end of the at least one engagement portion.

* * * * *